(12) United States Patent
Jeon et al.

(10) Patent No.: US 12,551,920 B2
(45) Date of Patent: Feb. 17, 2026

(54) ELECTRODE SLURRY LOT INFORMATION TRACKING MANAGEMENT SYSTEM, AND TRACKING MANAGEMENT METHOD THEREFOR

(71) Applicant: LG ENERGY SOLUTION, LTD., Seoul (KR)

(72) Inventors: Gi Yeong Jeon, Daejeon (KR); Jun Hyo Su, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 11 days.

(21) Appl. No.: 18/271,224

(22) PCT Filed: Aug. 3, 2022

(86) PCT No.: PCT/KR2022/011506
§ 371 (c)(1),
(2) Date: Jul. 6, 2023

(87) PCT Pub. No.: WO2023/014098
PCT Pub. Date: Feb. 9, 2023

(65) Prior Publication Data
US 2024/0058836 A1    Feb. 22, 2024

(30) Foreign Application Priority Data

Aug. 4, 2021 (KR) .......................... 10-2021-0102729

(51) Int. Cl.
*B05C 11/10* (2006.01)
*H01M 4/04* (2006.01)

(52) U.S. Cl.
CPC ....... *B05C 11/1002* (2013.01); *H01M 4/0404* (2013.01)

(58) Field of Classification Search
None
See application file for complete search history.

(56) References Cited

U.S. PATENT DOCUMENTS

| | | | |
|---|---|---|---|
| 2004/0159964 A1* | 8/2004 | Lavoie | H01M 4/0411 264/408 |
| 2014/0083358 A1* | 3/2014 | Reineccius | A01C 1/06 118/696 |
| 2018/0198113 A1* | 7/2018 | Ono | B05C 9/10 |

FOREIGN PATENT DOCUMENTS

| | | |
|---|---|---|
| CN | 107913639 B | 5/2019 |
| CN | 111709763 A | 9/2020 |

(Continued)

*Primary Examiner* — Charles Capozzi
(74) *Attorney, Agent, or Firm* — Bryan Cave Leighton Paisner LLP

(57) ABSTRACT

An electrode slurry lot information tracking management system for managing lot information of electrode slurry when the electrode slurry is transferred from a mixer to a coater. The system includes a plurality of tanks connected between the mixer and the coater through a pipe. The pipe is configured to transfer the electrode slurry supplied from the mixer to the coater. The system further includes a controller. The controller identifies the lot information of the electrode slurry. The controller allocates and records the lot information of the electrode slurry supplied to each of the plurality of tanks. The controller determines electrode slurry lot information of a final supply tank that supplies the electrode slurry to the coater based on a history of the lot information recorded for each of the plurality of tanks.

11 Claims, 5 Drawing Sheets

(56) References Cited

FOREIGN PATENT DOCUMENTS

| | | | |
|---|---|---|---|
| JP | H10-333710 | A | 12/1998 |
| JP | 3491619 | B2 | 11/2003 |
| JP | 2007148495 | A | 6/2007 |
| JP | 2008269311 | A | 11/2008 |
| JP | 2008-310467 | A | 12/2008 |
| JP | 2012103848 | A | 5/2012 |
| JP | 2013232365 | A | 11/2013 |
| JP | 2015036138 | A | 2/2015 |
| JP | 2017027708 | A | 2/2017 |
| JP | 2018-067433 | * | 4/2018 |
| JP | 2018067433 | A | 4/2018 |
| JP | 6119547 | B2 | 11/2022 |
| KR | 10-2004-0062278 | A | 7/2004 |
| KR | 10-1243473 | B1 | 3/2013 |
| KR | 10-2017-0114418 | A | 10/2017 |
| KR | 10-2020-0010330 | A | 1/2020 |
| KR | 10-2020-0030301 | A | 3/2020 |
| KR | 10-2021-0004631 | A | 1/2021 |
| KR | 10-2254336 | B1 | 5/2021 |
| WO | 2007/004347 | A1 | 1/2007 |

* cited by examiner

ELECTRODE SLURRY LOT INFORMATION TRACKING MANAGEMENT SYSTEM, AND TRACKING MANAGEMENT METHOD THEREFOR

CROSS-REFERENCE TO RELATED APPLICATION

This application is a National Phase entry pursuant to 35 U.S.C. 371 of International Application No. PCT/KR2022/011506 filed on Aug. 3, 2022, which claims priority to and the benefit of Korean Patent Application No. 10-2021-0102729, filed on Aug. 4, 2021, and the entire content of the Korean patent application is incorporated herein by reference.

TECHNICAL FIELD

The present disclosure relates to a system and method for tracking lot information of electrode slurry supplied from a mixer to a coater.

More specifically, the present disclosure relates to tracking lot information at a final supply tank stage at which electrode slurry is supplied to the coater.

BACKGROUND

Recently, rechargeable and dischargeable secondary batteries have been widely used as energy sources of wireless mobile devices. In addition, secondary batteries have attracted attention as energy sources of electric vehicles, hybrid electric vehicles, etc. that have been introduced as a solution to air pollution due to existing gasoline vehicles and diesel vehicles using fossil fuel. Therefore, the types of applications using a secondary battery are diversifying due to the advantages of secondary batteries, and secondary batteries are expected to be applied to more fields and products in the future.

A lithium secondary battery includes a positive electrode and a negative electrode that are a pair of electrodes, a separator that insulates the positive electrode and the negative electrode from each other, and an electrolyte. Each of the positive electrode and the negative electrode, which are electrodes of the secondary battery, is manufactured by forming a tab on an electrode substrate, which is obtained by applying electrode slurry on a surface of a current collector manufactured as a thin aluminum or copper plate and drying a resultant structure, and cutting the resultant electrode substrate in an appropriate size. The electrode slurry is a mixture of a solvent, an active material, a conductive material, a binder, etc. and is applied on the surface of the current collector to form the electrode substrate. For example, the electrode slurry (paste) is prepared by mixing an active material with other solids and mulling an obtained mixed particulate material with a dispersion medium such as NMP or water.

The electrode slurry is prepared by introducing and mixing components in a mixer and is transferred to a main tank using, e.g., a slurry batch container. Thereafter, the electrode slurry is sequentially transferred to a storage tank, a transfer tank, and a supply tank and is finally supplied to a coater (coating die) for coating the current collector with the electrode slurry. FIG. 1 is a schematic diagram illustrating the transfer of slurry between a plurality of tanks.

However, lot information, i.e., a slurry batch ID, of electrode slurry introduced into the plurality of tanks from a current mixer is managed on the basis of a storage tank other than a supply tank for supplying the electrode slurry to a coater. That is, slurry (logistics) is actually transferred through a main tank, a storage tank, a transfer tank, and a supply tank, but in a current logistics movement controller or management system, lot information is managed in the storage tank at a midpoint and thus lot information cannot be tracked at a final supply tank stage at which electrode slurry is introduced into the coater.

For example, in a process in which the main tank, the storage tank, the transfer tank, and the supply tank are unified as one pipe, lot information can be tracked in the supply tank even when the lot information is managed in the storage tank, but in a process in which one pipe splits into multiple tanks as shown in FIG. 1, data (lot information) cannot be identified in a final supply tank.

Therefore, in order to solve this problem, it is necessary to develop a technique for tracking lot information of electrode slurry transferred from a main tank to a supply tank and finally managing the lot information by checking the lot information at a stage of the supply tank.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

To address the above-described problem, the present disclosure is directed to an electrode slurry lot information tracking management system and method for recording lot information of electrode slurry supplied from a mixer to a coater to manage a history of the lot information and detecting lot information at a final supply tank stage using the history.

According to an aspect of the present disclosure, an electrode slurry lot information tracking management system for managing lot information of electrode slurry when the electrode slurry is transferred from a mixer to a coater may be provided. The system may includes: a plurality of tanks connected between the mixer and the coater through a pipe, the pipe being configured to sequentially transfer the electrode slurry supplied from the mixer to the coater, and a controller. The controller may identify lot information of the electrode slurry, allocate and record the lot information of the electrode slurry supplied to each of the plurality of tanks, and determine electrode slurry lot information of a final supply tank that supplies the electrode slurry to the coater based on a history of the lot information recorded for each of the plurality of tanks.

For example, the electrode slurry may include top slurry and back slurry and the top slurry and the back slurry may be transferred to downstream tanks of the plurality of tanks, wherein an upper surface of a current collector may be coated with the top slurry and a lower surface of the current collector is coated with the back slurry.

As an example, the plurality of tanks may include a storage tank into which the electrode slurry is introduced from a main tank, a transfer tank into which the electrode slurry is introduced from the storage tank, and the final supply tank into which the electrode slurry is introduced from the transfer tank and which supplies the electrode slurry to the coater.

For example, a first tank of the plurality of tanks that receives the electrode slurry may include an identification tag scanner configured to scan an identification tag on a slurry batch container. The identification tag scanner may detect the lot information of the electrode slurry based on the identification tag, and the identification tag scanner may transmit the lot information to the controller.

The system may further include a valve installed on the pipe coupled to the plurality of tanks, and the controller may receive a signal for opening the valve, detect a transfer of the electrode slurry between each of the plurality of tanks, the electrode slurry having predetermined lot information, and allocate and record the predetermined lot information of the detected electrode slurry transferred to each of the plurality of tanks.

For example, during the allocation and recording of the lot information to each of the plurality of tanks, upon determining the electrode slurry is not introduced into a subsequent tank from the plurality of tanks, the controller may maintain the lot information allocated to each of the plurality of tanks without updating, and upon determining additional electrode slurry is introduced from an upstream tank to the plurality of tanks and the electrode slurry is not introduced to the subsequent tank, the controller may allocate additional lot information of the additional electrode slurry to each of the plurality of tanks in addition to the lot information allocated to each of the plurality of tanks.

In one embodiment, upon allocating the additional lot information of the additional electrode slurry, if the electrode slurry is introduced from the plurality of tanks to the subsequent tank, the controller may delete the lot information allocated to each of the plurality of tanks and may maintain the lot information of the additional electrode slurry for each of the plurality of tanks according to the first-in first-out principle.

As another example, upon allocating and recording of the lot information of each of the plurality of tanks, the controller may maintain the lot information allocated to each of the plurality of tanks without updating when the electrode slurry is introduced into the subsequent tank, and when the additional electrode slurry is not introduced from the upstream tank, and the electrode slurry is introduced into the subsequent tank and the additional electrode slurry is introduced from the upstream tank, the controller may update the lot information allocated to each of the plurality of tanks with the lot information of the additional electrode slurry introduced from the upstream tank.

The controller may transmit the electrode slurry lot information of the final supply tank to a manufacturing execution system of a factory.

In an embodiment of the present disclosure, an upstream tank may introduce the electrode slurry into the final supply tank, and the controller may record and manage identification information of the upstream tank in accordance with the electrode slurry lot information of the final supply tank.

According to another aspect of the present disclosure, an electrode slurry lot information tracking management method of managing lot information of electrode slurry when the electrode slurry is transmitted from a mixer to a coater through a plurality of tanks connected by a pipe, the may include: identifying and recording, by a controller, the lot information of the electrode slurry supplied from the mixer, when the electrode slurry is transferred sequentially through the plurality of tanks, allocating and recording, by the controller, the lot information of the electrode slurry supplied to each of the tanks for each of the plurality of tanks, and determining, by the controller, lot information of a final supply tank, and the final supply tank may supply the electrode slurry to the coater, based on the lot information recorded for each of the plurality of tanks.

In one embodiment, during the allocation and recording of the lot information for each of the tanks, the lot information of the electrode slurry may be allocated and recorded for each of the tanks according to at least one of the following allocation principles:

1) the lot information allocated to each of the plurality of tanks is maintained without being updated when the electrode slurry is not introduced into a subsequent tank;
2) when additional electrode slurry is introduced from an upstream tank and the electrode slurry is not introduced into a subsequent tank, additional lot information of the additional electrode slurry is allocated to each of the plurality of tanks in addition to the lot information allocated to each of the plurality of tanks;
3) the lot information allocated to each of the plurality of tanks is maintained without being updated when, the electrode slurry is introduced into the subsequent tank and the additional electrode slurry is not introduced from the upstream tank;
4) when the electrode slurry is introduced into the subsequent tank and the additional electrode slurry is introduced from the upstream tank, the lot information allocated to each of the plurality of tanks is updated with the additional lot information of the additional electrode slurry introduced from the upstream tank; and
5) when the additional lot information of the additional electrode slurry is allocated in addition to the lot information allocated to each of the plurality of tanks, if the electrode slurry is introduced from the plurality of tanks to the subsequent tank, the lot information allocated to each of the plurality of tanks is deleted and the additional lot information of the additional electrode slurry is maintained for each of the plurality of tanks according to the first-in first-out principle.

Advantageous Effects

According to the present disclosure, lot information of electrode slurry can be identified at a supply tank stage. Thus, the quality of the electrode slurry produced from a corresponding supply tank can be tracked.

In addition, when an electrode has a defect or a battery manufactured using the electrode malfunctions, a lot of electrode slurry used to manufacture the battery can be identified and thus the defect or a cause of the malfunction can be easily found.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE PREFERRED EMBODIMENTS

Hereinafter, the present disclosure will be described in detail. First, the terms or expressions used in the present specification and claims should not be construed as being limited to those generally understood or defined in commonly used dictionaries, and should be understood according to meanings and concepts in line with the present disclosure on the basis of the principle that the inventor(s) of the application can appropriately define the terms or expressions to optimally explain the present disclosure.

It should be understood that the terms "comprise" and/or "comprising," when used herein, specify the presence of stated features, integers, steps, operations, elements, components, or a combination thereof, but do not preclude the presence or addition of one or more other features, integers, steps, operations, elements, components, or a combination thereof. It should be understood that when a component such as a layer, a film, a region, a plate or the like is referred to as being "on" another component, the component may be "right on" the other component or another component may be interposed between the components. It should be understood that when a component such as a layer, a film, a region, a plate or the like is referred to as being "below" another component, the component may be "right below" the other component or another component may be interposed between these components. In addition, it should be understood that when a component is "on" another component, the component is on or below another component.

Figure 1:
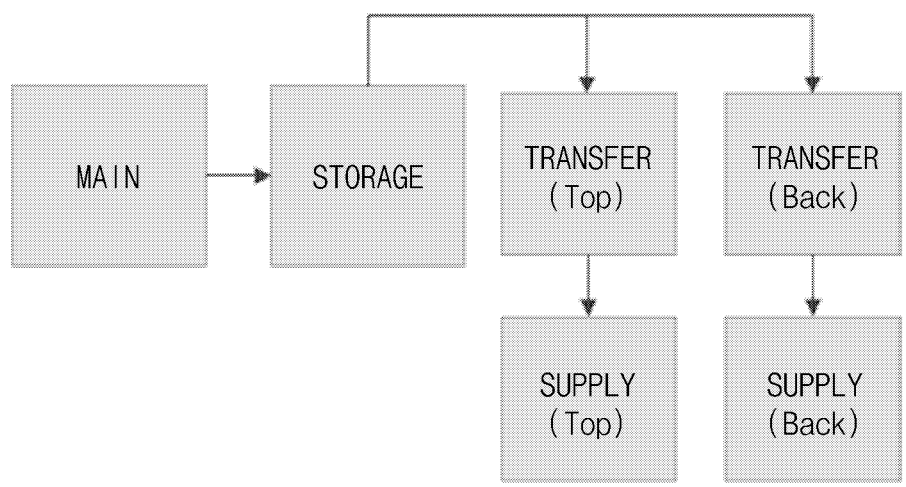
FIG. 1 is a schematic diagram illustrating the transfer of slurry between a plurality of tanks installed between a mixer and a coater.
Figure 2:
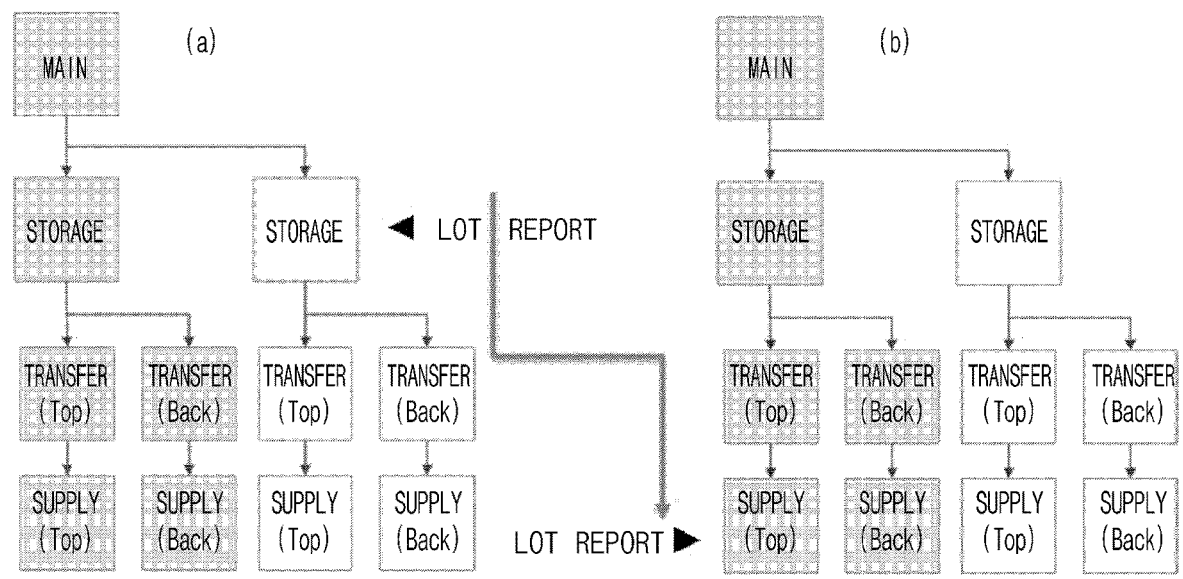
FIG. 2 is a schematic diagram illustrating a difference between the related art and an electrode slurry lot information tracking management mechanism of the present disclosure.

FIG. 2 is a schematic diagram illustrating the difference between the related art and an electrode slurry lot information tracking management mechanism of the present disclosure.

Referring to FIG. 2A, in the related art, lot information of electrode slurry is managed with respect to a storage tank rather than a supply tank for actually supplying electrode slurry to a coater. That is, at a storage tank stage, the lot information of the electrode slurry is checked and reported to a manufacturing execution system (MES) of a factory. Therefore, according to the related art, lot information cannot be tracked at a final supply tank stage.

Referring to FIG. 2B, according to the present disclosure, lot information of electrode slurry is managed in a final supply tank. To this end, according to the present disclosure, lot information of electrode slurry is allocated and recorded for individual tanks as will be described below. In addition, the lot information of the final supply tank that supplies the electrode slurry to a coater may be detected by referring to a history of the lot information recorded for each of the tanks. Accordingly, according to the present disclosure, lot information can be tracked at a final supply tank stage, and lot information detected at a supply tank stage can be transmitted to a MES of a factory to use the lot information to control the quality of used electrode slurry or track the electrode slurry and manage the quality or a defect of an electrode or a battery manufactured using the electrode slurry.

The lot information is identification information for identifying data such as the type, composition, etc. of the electrode slurry supplied from a mixer to a main tank. For example, the lot information may include a lot number, lot ID, batch ID, etc. of the electrode slurry. Generally, the lot information such as the batch ID is provided on a batch container of the electrode slurry supplied to the main tank from the mixer. The lot information may be recognized by scanning an identification tag (e.g., barcode) on the batch container or recognized by a sensor installed between the mixer and the main tank. The recognized lot information may be transmitted to a controller (a PLC controller) for controlling the transfer of the electrode slurry, and the controller of the present disclosure may identify the lot information to be used for lot information tracking management.

Hereinafter, the present disclosure will be described in detail with reference to embodiments thereof.

First Embodiment

Figure 3:
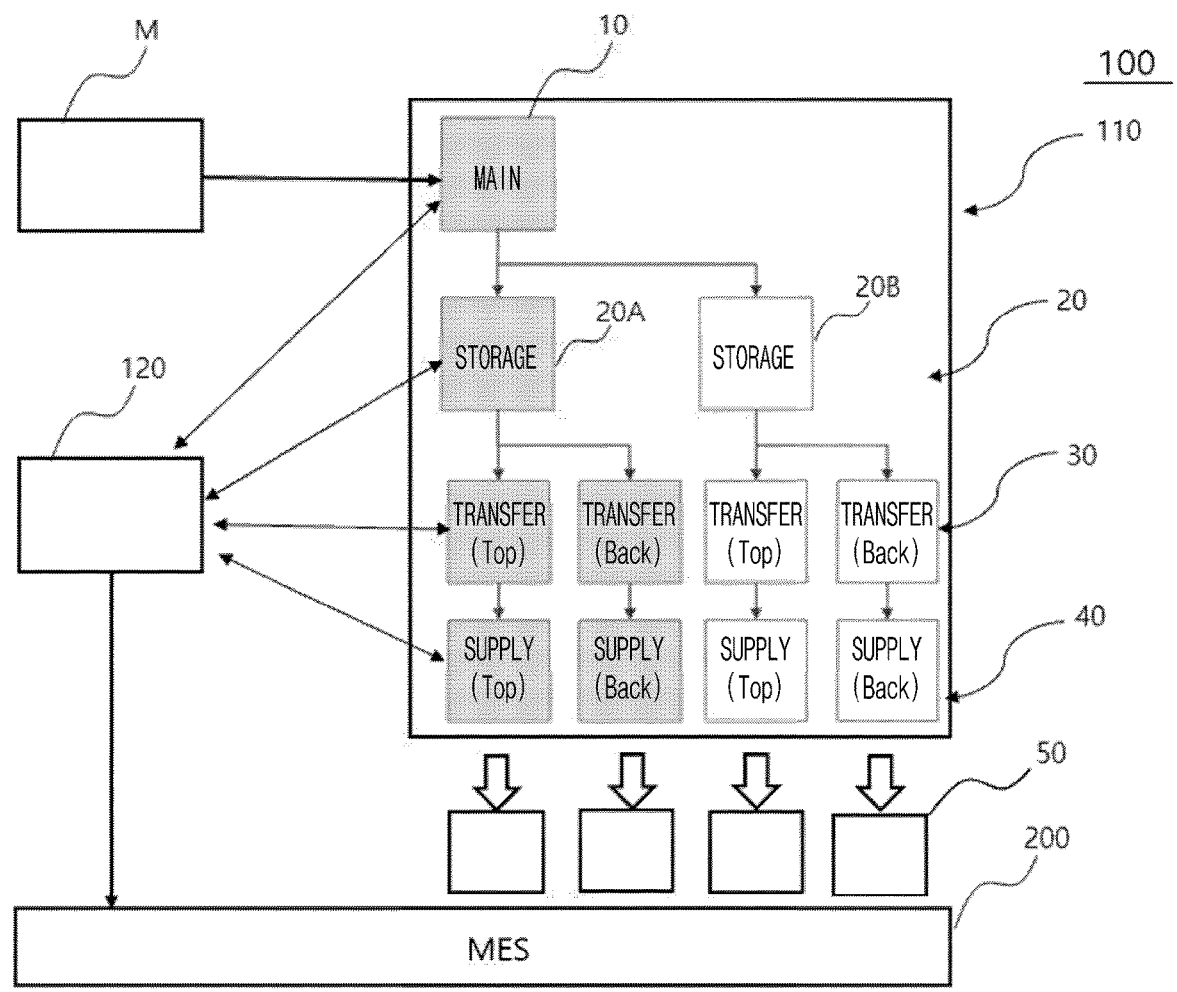
FIG. 3 is a block diagram of an electrode slurry lot information tracking management system according to an embodiment of the present disclosure.

FIG. 3 is a block diagram of an electrode slurry lot information tracking management system 100 according to an embodiment of the present disclosure.

The lot information tracking management system 100 of the present disclosure is intended to manage lot information of electrode slurry when the electrode slurry is transferred to a coater 50 from a mixer M that mixes materials of the electrode slurry to produce the electrode slurry.

A side surface of a current collector coated with the electrode slurry may vary according to the type of electrode slurry to be applied, and the amount of the electrode slurry coated by a coater may vary according to a coating rate or timing. Thus, it is difficult to transfer the electrode slurry directly to the coater 50 from the mixer M, and a plurality of tanks 110 are arranged between the mixer M and the coater 50. That is, the plurality of tanks 110 are connected between the mixer M and the coater 50 through a pipe, and configured to sequentially transfer the electrode slurry supplied from the mixer M to the coater 50.

As shown in FIG. 3, electrode slurry from a tank located upstream may be split and transferred to a plurality of tank located downstream, respectively, among the plurality of tanks 110 in a supply order. As described above, lot information is easy to detect at a stage of a supply tank 40 in a process in which the main tank 10 to the supply tank 40 are unified as one pipe, but lot information is not easy to track at a stage of the final supply tank 40 when electrode slurry is split and transferred sequentially to tank located downstream as shown in FIG. 3. To solve this problem, in the present disclosure, lot information of the electrode slurry supplied to each tank is allocated and recorded for each tank, and lot information of the supply tank 40 is detected by referring to a history of the lot information at a final supply tank stage as will be described below.

There are cases in which the electrode slurry is applied on only a side surface of a current collector, but in most cases, the electrode slurry is applied on upper and lower surfaces of the current collector to increase a capacity and manufacture a stacked cell. FIG. 3 illustrates that electrode slurry is split into top slurry to be applied on the upper surface of the current collector and back slurry to be applied on the lower surface of the current collector and the top slurry and the back slurry are transferred to a plurality of sub tanks. Slurry may be split directly when the slurry is transferred from a highest tank to a next-highest tank or may be split when the slurry is transferred to a middle or lower tank after the next-highest tank. There may be a large number of cases of the split of the electrode slurry and an arrangement and design of the plurality of tanks according to the split of the electrode slurry in conjunction with the number, arrangement, type, etc. of coaters. That is, in addition to that shown in FIG. 3, a split line of the electrode slurry and a tank line or arrangement according to the split line may be designed in various ways.

FIG. 3 illustrates a main tank 10, a storage tank 20, a transfer tank 30, and a supply tank 40 to describe a typical example of the transfer of the electrode slurry from the mixer M to the coater. The main tank 10 is a start point of the transfer of the electrode slurry, and the lot information of the electrode slurry introduced into the main tank 10 may be easily identified. Therefore, according to the present disclosure, the lot information of the electrode slurry generally from the storage tank 20 to the supply tank 40 may be tracked and managed. The plurality of tanks 110, which are lot information tracking management targets, may include the storage tank 20 to which the electrode slurry is supplied from the main tank 10, the transfer tank 30 to which the electrode slurry is supplied from the storage tank 20, and the supply tank 40 to which the electrode slurry is supplied from the transfer tank 30 and which supplies the electrode slurry to the coater 50. In FIG. 3, the electrode slurry from the main tank 10 is supplied to two storage tanks 20A and 20B and is split into top slurry and back slurry in each of the storage tanks 20A and 20B, and the top slurry and the back slurry are supplied to a top slurry supply tank and a back slurry supply tank. The top slurry and the back slurry are transferred from the transfer tanks 30 to the supply tank 40 in 1:1 correspondence and are supplied to the coaters 50. However, this is only an example of an arrangement of a main tank, a storage tank, a transfer tank, and a supply tank, and an arrangement of tank lines for supplying slurry is variable. According to the present disclosure, lot information of the electrode slurry at a supply tank stage may be detected in response to various arrangements of tank lines.

In the present disclosure, a controller 120 identifies lot information of the electrode slurry and allocates and records lot information of the electrode slurry supplied to each tank for each tank, and detects lot information of a final supply tank, which supplies the electrode slurry to the coater, by referring to a history of the lot information recorded for each tank.

The controller 120 may be, for example, the controller 120 (PLC controller) for controlling the transfer of the electrode slurry. The controller 120 for controlling the transfer of the electrode slurry may control the transfer of the electrode slurry by controlling an opening and closing valve (not shown) installed on a pipe connecting tanks. Alternatively, when a cover is attached to each tank, the controller 120 may also control the cover to be opened or closed. A PLC controller is a typical example of the controller 120.

When the mixer M and the main tank 10 are connected through the pipe, the controller 120 transfers the electrode slurry by opening the opening and closing valve on the pipe and controlling a cover to be opened when the cover is installed on the main tank 10. Alternatively, when slurry from the mixer M is transferred to the main tank 10 through a slurry batch container (not shown), the controller 120 may control the transfer of the slurry batch container through a conveyor. Alternatively, the controller 120 may control pipes installed among the main tank 10, the storage tank 20, the transfer tank 30, the supply tank 40, and the coater 50 to be opened or closed to supply the electrode slurry to the coater 50. The transfer of slurry through the pipe using the opening and closing valve is well known and thus detailed description thereof is omitted here.

Because the controller 120 controls the transfer of the electrode slurry, lot information of the electrode slurry introduced into a corresponding tank may be obtained when the electrode slurry is transferred from the mixer M to the main tank 10 and when the electrode slurry is transferred between tanks.

There may be a case in which it is difficult to transfer the electrode slurry directly to the main tank 10 from the mixer M due to the difference in capacity between the mixer M and the main tank 10 or the like. Thus, the electrode slurry from the mixer M may be transferred to the main tank 10 using a slurry batch container. In this case, an identification tag (e.g., barcode) (not shown) storing information (lot information or the like) about corresponding electrode slurry may be provided on the slurry batch container, and the main tank 10 may scan the identification tag to obtain the lot information of the electrode slurry. To this end, the main tank 10 may include an identification tag scanner (e.g., a barcode scanner) (not shown). Alternatively, the identification tag scanner may be installed in a place adjacent to the main tank 10. The identification tag scanner may transmit identified lot information of the electrode slurry to the controller 120 so that the controller 120 may identify the lot information of the electrode slurry.

Identification of lot information of the electrode slurry and allocation of lot information to each tank by the controller 120 may be performed by sensing a signal of the opening and closing valve applied to the transfer of the electrode slurry by the controller 120. For example, an electronic opening and closing valve such as a solenoid valve is installed on a connection pipe between the plurality of tanks 120. The controller 120 may detect the transfer of electrode slurry corresponding to certain lot information between tanks when the solenoid valve is open. Thus, the controller 120 may allocate and record the lot information of the detected electrode slurry on each tank.

As described above, the controller 120 that controls the transfer of electrode slurry may identify certain lot information of electrode slurry from an "open" signal from the identification tag scanner or the solenoid valve, and allocate and record the identified lot information on each tank. As shown in FIG. 3, such lot information is allocated and recorded for each tank according to the flow of electrode slurry in a plurality of tank lines connected downstream from upstream. Such lot information is sequentially recorded until a stage of the final supply tank 40 according to transfer of slurry. Accordingly, the controller 120 of the present disclosure is capable of identifying and detecting lot information of electrode slurry at a final supply tank stage at which electrode slurry is supplied to the coater by referring to a history of the lot information recorded for each tank.

A process of allocating and recording lot information of electrode slurry for each tank will be described in detail below.

Figure 4:
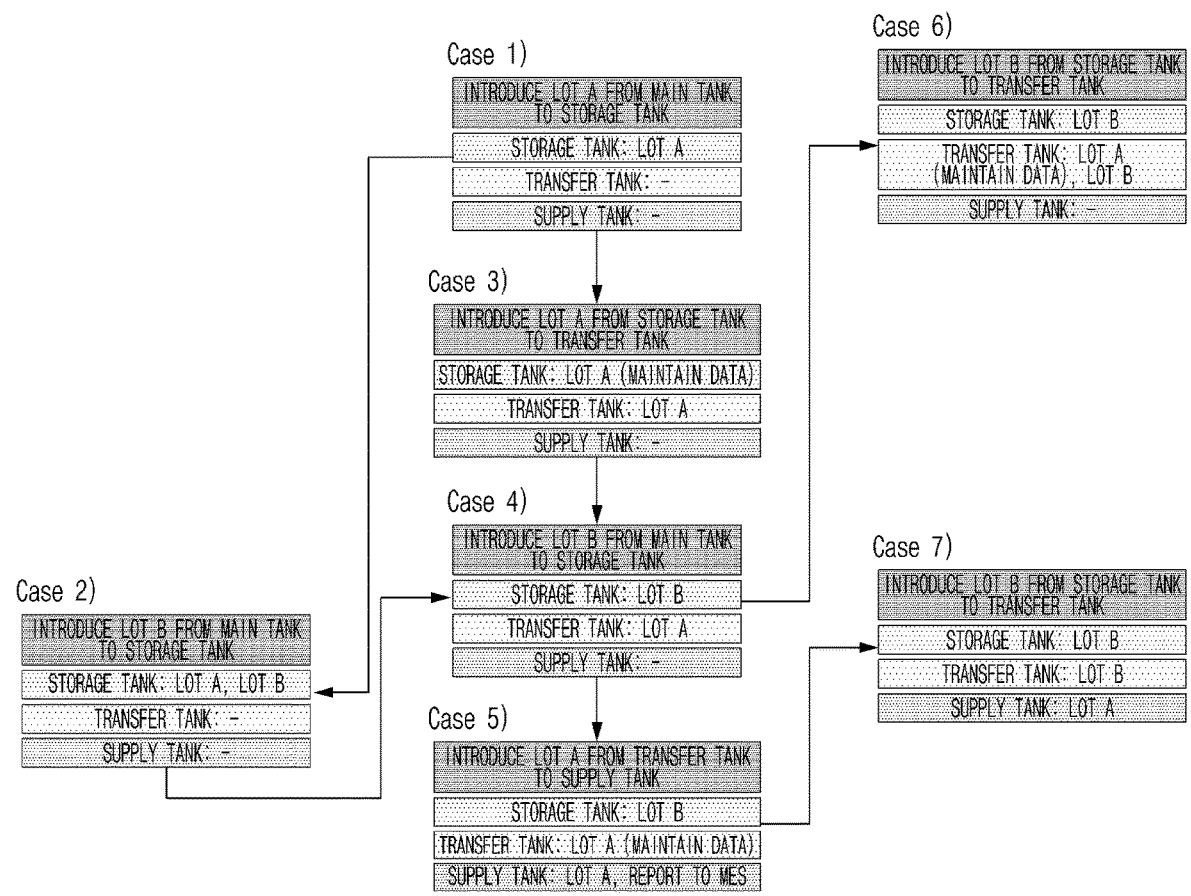
FIG. 4 is a schematic diagram illustrating a process of allocating and recording lot information of electrode slurry according to the present disclosure.

FIG. 4 is a schematic diagram illustrating a process of allocating and recording lot information of electrode slurry according to the present disclosure.

In the present disclosure, the controller 120 allocates and records lot information of the electrode slurry for each tank according to a unique algorithm.

Although FIG. 3 illustrates that electrode slurry is split and transferred to tanks, basically, the algorithm of the controller 120 is subject to the transfer of slurry with respect to one vertical tank transfer line. That is, lot information of electrode slurry is allocated and recorded based on an assumption that the main tank 10, the storage tank 20, the transfer tank 30, and the supply tank 40 are connected in series for each tank. Lot information of the electrode slurry of the final supply tank 40 may be detected by finding the flow of the electrode slurry in tank transfer lines connected in series.

Such a lot information allocation algorithm applied to a serial tank transfer line may also apply to an electrode slurry split line. That is, when the main tank 10, which is a tank located upstream, is split into the storage tanks 20A and 20B, the serial tank transfer line is split into two tank transfer lines, i.e., an A tank transfer line consisting of the storage tank 20A of a main tank 10-A, a transfer tank located downstream and a supply tank located downstream and a B tank transfer line consisting of the storage tank 20B of a main tank 10-B, a transfer tank located downstream, and a supply tank located downstream. In this case, the lot information allocation algorithm is applied to the A tank transfer line and the B tank transfer line. When the electrode slurry is split again at a stage of a tank (e.g., the transfer tank 30) at a midpoint between the A tank transfer line and the B tank transfer line, the number of serial tank transfer lines may be increased according to the split of the electrode slurry, and the lot information allocation algorithm may also be applied to the increased number of serial tank transfer lines to detect lot information at a final supply tank stage. Generally, electrode slurry is split in 1:1 correspondence with each tank and thus the lot information allocation algorithm of the present disclosure is also applied based on an assumption that the electrode slurry is split in 1:1 correspondence.

Referring to FIG. 4, when lot information is allocated and recorded on each tank by the controller 120, the lot information allocated to each tank is maintained without being updated when there is no history of introducing the electrode slurry into a subsequent tank, and when electrode slurry is additionally introduced from a tank located upstream in a state in which there is no history of introducing the electrode slurry into the subsequent tank, lot information of the additionally introduced electrode slurry is additionally allocated to each tank, in addition to the lot information allocated to each tank.

Specifically, lot information allocated to each tank is maintained without being updated when there is no history of introducing electrode slurry into a next tank (allocation principle 1).

It is assumed that electrode slurry of lot A is introduced into the main tank 10 at a stage before Case 1 of FIG. 4. Information of lot A is transmitted to the controller 120 by the identification tag scanner, and the controller 120 allocates the information of lot A to the main tank 10. Case 1 of FIG. 4 indicates that the electrode slurry of lot A is introduced from the main tank 10 to the storage tank 20 and there is no history of introducing electrode slurry into subsequent tanks (a transfer tank and a supply tank). In this case, the information of lot A allocated to the storage tank 10 is maintained according to allocation principle 1.

When electrode slurry from a tank located upstream is introduced in a state in which there is no history of injecting electrode slurry into a subsequent tank, lot information of the additionally introduced electrode slurry is additionally allocated to each tank, in addition to the lot information allocated to each tank (allocation principle 2).

In Case 2 of FIG. 4, when electrode slurry of lot B is introduced into the storage tank 20 in a state in which the electrode slurry of lot A has been introduced into the storage tank 20, information of lot B is allocated to the storage tank 20 in addition to the information of lot A, because slurry is not introduced from the storage tank 20 into a subsequent tank (allocation principle 2).

The lot information allocation algorithm of the present disclosure further includes the following allocation principles. The lot information allocated to each tank is maintained without being updated when, although there is a history of introducing electrode slurry into a subsequent tank, electrode slurry is not introduced from a tank located upstream of the tank (allocation principle 3).

When there is a history of introducing electrode slurry into a subsequent tank and electrode slurry is introduced from a tank located upstream of the tank, the lot information allocated to each tank is updated with lot information of the electrode slurry introduced from the tank located upstream (allocation principle 4).

In Case 3 of FIG. 4, the electrode slurry of lot A is transferred to the transfer tank 30 from the storage tank 20 to which the information of lot A has been allocated. However, in this case, the information of lot A allocated to the storage tank 20 is not directly deleted and is maintained according to allocation principle 3 because no slurry is introduced into the storage tank 20 from the main tank 10, which is a tank located upstream.

In Case 4, when the electrode slurry of lot B is introduced from the main tank 10 into the storage tank 20, the lot information of the storage tank 20 is updated (allocation principle 4). In this case, there is a history of introducing slurry into the transfer tank 30 in Case 3 and electrode slurry is introduced into the storage tank 20 from the main tank 10, which is a tank located upstream, in Case 4, allocation principle 4 applies and thus the lot information of the storage tank 20 is updated from lot A to lot B.

Meanwhile, when the lot information of the additionally introduced electrode slurry is additionally allocated in addition to the lot information allocated to each tank, the lot information allocated to each tank is deleted and only the lot information of the additionally introduced electrode slurry is maintained for each tank according to the first-in first-out principle (allocation principle 5).

This should be understood to mean that the electrode slurry is transferred from Case 2 to Case 4.

When the information of lot A and the information of lot B are allocated from the storage tank 20 in Case 2, the electrode slurry of lot A is transferred to the transfer tank 30 according to the first-in first-out principle and thus the information of lot A is deleted and only the information of lot B is maintained, when the electrode slurry is transferred from the storage tank 20 to the transfer tank 30 as in Case 4.

The transfer of slurry between the storage tank 20, the transfer tank 30, and the supply tank 40 that are located between the main tank 10 and the coater 50 may be described using allocation principles 1 to 5. Therefore, these allocation principles may be implemented as an algorithm or a program, so that lot information may be allocated and recorded on each tank and lot information of the final supply tank 40 may be detected by referring to a history of the recorded lot information. To this end, a program or software related to allocation principles 1 to 5 may be installed in the controller 120 or the controller 120 may be connected to a storage device storing the software.

Referring to Case 5, slurry of lot A of Case 4 is supplied from the transfer tank 30 to the supply tank 40. In this case, the information of lot A allocated to the transfer tank 30 is maintained according to allocation principle 3. Because lot information of the final supply tank 40 is identified (detected) as lot A, the controller 120 detects the lot information. The controller 120 reports the detected lot information to an MES 200.

When slurry is transferred from Case 4 to Case 6, the electrode slurry of lot B is additionally introduced into the transfer tank 30 from the storage tank 20. In this case, the information of lot B is allocated to the transfer tank 30 in addition to the information of lot A according to allocation principle 2.

When it is assumed that slurry is transferred from Case 5 to Case 7, the electrode slurry of lot B is introduced into the transfer tank 30 from the storage tank 20. This corresponds to allocation principle 4 and thus lot information allocated to the transfer tank 30 is updated with lot B.

As described above, according to the present disclosure, electrode slurry may be transferred, variable lot information of each tank may be recorded, and lot information of a final supply tank may be detected by referring to a history of the lot information according to a unique lot information allocation algorithm.

Second Embodiment

Figure 5:
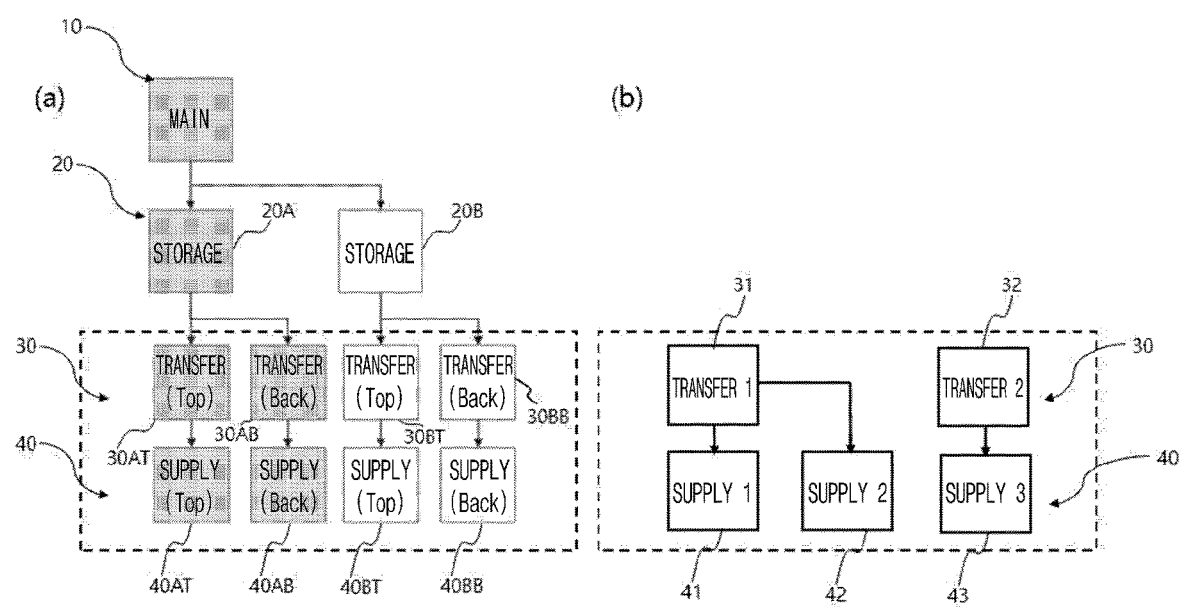
FIG. 5 is a schematic diagram illustrating an electrode slurry lot information tracking management system according to another embodiment of the present disclosure.

FIG. 5 is a schematic diagram illustrating an electrode slurry lot information tracking management system according to another embodiment of the present disclosure.

A controller 120 of an electrode slurry lot information tracking management system 100 of the present disclosure may record and manage identification information of a tank located upstream, which introduces electrode slurry into a final supply tank 40, in association with lot information of the electrode slurry transferred to the final supply tank 40.

According to the present disclosure, lot information may be allocated and recorded for each tank that transfers electrode slurry, and lot information of the supply tank 40 may be detected using an algorithm of allocation principles 1 to 5 described above. Details of the arrangement and design of a tank transfer line 110 including a storage tank 20, a transfer tank 30, and the supply tank 40 between a main tank 10 and a coater 50 are stored in the controller 120 and thus identification information (tank ID) of each tank of the tank transfer line 110 is also stored in the controller 120.

The controller 120 may allocate lot information to each tank and record data of the lot information and the identification information of each tank is input to the controller 120, and thus the identification information of each tank may match the lot information input to each tank. In particular, identification information of a tank located upstream for introducing electrode slurry into the final supply tank 40 may also be recorded and managed. Specifically, referring to FIG. 5A, in a part indicated with a box of broken lines, lot information of electrode slurry introduced into each supply tank 40 may be identified using the allocation algorithm, and identification information of a transfer tank located upstream of each supply tank 40 may be recorded and managed by matching the identification information with the lot information.

For example, in FIG. 5A, at a stage of a supply tank, when electrode slurry of lot A and electrode slurry of lot B diverge to storage tanks 20A and 20B, a supply tank 30AT that supplies top slurry of the electrode slurry of lot A, a supply tank 30AB that supplies back slurry of the electrode slurry of lot A, a supply tank 30BT that supplies top slurry of the electrode slurry of lot B, and a supply tank 30BB that supplies back slurry of the electrode slurry of lot B can be identified. In addition, tank IDs of transfer tanks 40AT, 40AB, 40BT, and 40BB, which are tanks for introducing electrode slurry into supply tanks, may be recorded by the controller 120 to correspond to the supply tanks 30AT, 30AB, 30BT, and 30BB. Specifically, an ID of a transfer tank may be recorded in association with an ID and slurry lot information of a supply tank.

Alternatively, when lines of transfer tanks and supply tanks are configured as shown in FIG. 5B, a first transfer tank 31 may be connected with a first supply tank 41 to introduce electrode slurry into the first supply tank 41 (a combination of a first supply tank and a first transfer tank), the first transfer tank 31 may be connected with a second supply tank 42 to introduce electrode slurry into the second supply tank 42 (a combination of a second supply tank and the first transfer tank), and the second transfer tank 32 may be connected with a third supply tank 43 to introduce electrode slurry into the third supply tank 43 (a combination of a third supply tank and the second transfer tank). According to the present disclosure, information about an arrangement of each tank may be identified from information about a tank transfer line stored in the controller 120, and lot information allocated to each tank may be connected with the information about the arrangement of each tank. Therefore, the controller 120 may record and manage identification information of a tank located upstream for introducing electrode slurry into a final supply tank in connection with lot information of the electrode slurry of the final supply tank.

In addition, the present disclosure provides an electrode slurry lot information tracking management method which is a method of managing electrode slurry lot information when electrode slurry is transferred from a mixer M to a coater through a plurality of tanks connected through a pipe.

First, the lot information of the electrode slurry supplied from the mixer M is identified and recorded. In this case, in the main tank 10 among a plurality of tanks 110, an identification tag on an electrode slurry transfer container (batch container) may be scanned to identify the lot information of the electrode slurry. To this end, an identification tag scanner may be provided at a side of the main tank 10, and lot information identified by the scanner may be transmitted to and recorded by the controller 120.

Next, when the electrode slurry is transferred sequentially through the tanks 110, lot information of the electrode slurry supplied to each of the tanks 110 is allocated and recorded on each of the tanks 110. The allocation and recording of the lot information may be performed by the controller 120 that transfers the electrode slurry between tanks.

The allocation of the lot information may be performed according to allocation principles 1 to 5 described above.

Lastly, lot information of a final supply tank 40 that supplies electrode slurry to the coater is detected by referring to a history of the lot information recorded for each tank. The controller 120 may detect the lot information of the final supply tank 40 by referring to the lot information recorded by each tank according to allocation principles 1 to 5. The detected lot information may be transmitted to an MES 200 of a factory to be used to control the quality of the electrode slurry, manage electrodes and final products, and analyze causes of defects.

According to the present disclosure, the controller 120 may identify the type of electrode slurry introduced for each coater by detecting electrode slurry lot information at a final supply tank stage. In addition, the electrode slurry lot information may be transmitted to an MES of a server or factory to be used for quality control of electrodes and batteries. Specifically, when a defect such as a defective exterior occurs in an electrode coated with electrode slurry by a certain coater, the quality of the electrode slurry may be tracked by identifying lot information of the electrode slurry of the electrode. When a defect occurs in a battery that is a final product, a cause of the defect may be found by tracking lot information of an electrode and electrode slurry.

The above description is only an example of the technical idea of the present disclosure and various modifications and changes may be made by those of ordinary skill in the technical field to which the present disclosure pertains without departing from the essential features of the present disclosure. Therefore, the drawings of the present disclosure set forth herein are intended not to limit the technical idea of the present disclosure but to describe the technical idea, and the scope of the technical idea of the present disclosure is not limited by the drawings. The scope of protection for the present disclosure should be interpreted based on the following claims and all technical ideas within the same scope as the present disclosure should be interpreted as being included in the scope of the present disclosure.

In the present specification, terms representing directions such as upper, lower, left, right, forward and backward directions are used only for convenience of description and thus it will be obvious that these terms may be changed according to a position of an object or an observer.

REFERENCE NUMERALS

10: main tank
20: storage tank
20a, 20b: storage tank
30: transfer tank
30AT: top slurry transfer tank of slurry A
30AB: back slurry transfer tank of slurry A
30BT: top slurry transfer tank of slurry B
30BB: back slurry transfer tank of slurry B
31: first transfer tank
32: second transfer tank
40: supply tank
40AT: top slurry supply tank of slurry A
40AB: back slurry supply tank of slurry A
40BT: top slurry supply tank of slurry B
40BB: back slurry supply tank of slurry B
41: first supply tank
42: second supply tank
43: third supply tank
50: coater
M: mixer
110: multiple tanks (transfer line)
120: controller
100: lot information tracking management system of electrode slurry
200: manufacturing execution system (MES)

What is claimed is:

1. An electrode slurry lot information tracking management system for managing lot information of electrode slurry when the electrode slurry is transferred from a mixer to a coater, the system comprising:
   at least one plurality of tanks connected to the coater through a pipe, the pipe being configured to sequentially transfer the electrode slurry supplied from the plurality of tanks to the coater; and
   a controller,
   wherein the controller is configured to identify the lot information of the electrode slurry,
   wherein the controller is configured to allocate and record the lot information of the electrode slurry sequentially supplied to the plurality of tanks,
   wherein, during the allocation and recording of the lot information to each of the plurality of tanks, upon determining the electrode slurry is not introduced into a subsequent tank from the plurality of tanks, the controller is configured to maintain the lot information allocated to each of the plurality of tanks without updating, and
   upon determining additional electrode slurry is introduced from an upstream tank to the plurality of tanks and the electrode slurry is not introduced to the subsequent tank, the controller is configured to allocate additional lot information of the additional electrode slurry to each of the plurality of tanks in addition to the lot information allocated to each of the plurality of tanks, and
   wherein the controller is configured to determine electrode slurry lot information of a final supply tank that supplies the electrode slurry to the coater by referring to a history of the lot information recorded for the plurality of tanks at a final supply tank stage.

2. The system of claim 1, wherein the electrode slurry comprises top slurry and back slurry, and the at least one plurality of tanks comprises a first plurality of tanks and a second plurality of tanks,
   wherein the top slurry and the back slurry are transferred to downstream tanks of the respective first and second plurality of tanks,
   wherein an upper surface of a current collector is coated with the top slurry and a lower surface of the current collector is coated with the back slurry.

3. The system of claim 1, wherein the plurality of tanks comprises:
   a storage tank into which the electrode slurry is introduced from a main tank;
   a transfer tank into which the electrode slurry is introduced from the storage tank; and
   the final supply tank into which the electrode slurry is introduced from the transfer tank and which supplies the electrode slurry to the coater.

4. The system of claim 1, wherein a first tank of the plurality of tanks that receives the electrode slurry comprises an identification tag scanner,
   wherein the identification tag scanner is configured to scan an identification tag on a slurry batch container,
   wherein the identification tag scanner is configured to detect the lot information of the electrode slurry based on the identification tag, and
   wherein the identification tag scanner is configured to transmit the lot information to the controller.

5. The system of claim 1, further comprising a valve installed on the pipe coupled to the plurality of tanks,
   wherein the controller is configured to receive a signal for opening the valve,
   wherein the controller is configured to detect a transfer of the electrode slurry between each of the plurality of tanks, the electrode slurry having predetermined lot information, and
   wherein the controller is configured to allocate and record the predetermined lot information of the detected electrode slurry transferred to each of the plurality of tanks.

6. The system of claim 1, wherein, upon the allocation of the additional lot information of the additional electrode slurry to each of the plurality of tanks, if the electrode slurry is introduced from the plurality of tanks to the subsequent tank, the controller is configured to delete the lot information allocated to each of the plurality of tanks and maintain the additional lot information of the additional electrode slurry allocated to each of the plurality of tanks according to a first-in first-out principle.

7. The system of claim 1, wherein, upon the allocation and recording of the lot information to each of the plurality of tanks, the controller is configured to maintain the lot information allocated to each of the plurality of tanks without updating when the electrode slurry is introduced into the subsequent tank and the additional electrode slurry is not introduced from the upstream tank, and wherein when the electrode slurry is introduced into the subsequent tank and the additional electrode slurry is introduced from the upstream tank, the controller is configured to update the lot information allocated to each of the plurality of tanks with the additional lot information of the additional electrode slurry introduced from the upstream tank.

8. The system of claim 1, wherein, upon the allocation and recording of the lot information to each of the plurality of tanks, the controller is configured to maintain the lot information allocated to each of the plurality of tanks without updating when the electrode slurry is introduced into the subsequent tank and the additional electrode slurry is not introduced from the upstream tank, and upon determining the electrode slurry is introduced into the subsequent tank and the additional electrode slurry is introduced from the upstream tank, the controller is configured to update the lot information allocated to each of the plurality of tanks with the additional lot information of the additional electrode slurry introduced from the upstream tank.

9. The system of claim 8, wherein, when the additional lot information of the additional electrode slurry is allocated to each of the plurality of tanks in addition to the lot information allocated to each of the plurality of tanks, upon determining the electrode slurry is introduced from the plurality of tanks to the subsequent tank, the controller is configured to delete the lot information allocated to each of the plurality of tanks and maintain the additional lot information of the additional electrode slurry allocated to each of the plurality of tanks according to a first-in first-out principle.

10. The system of claim 1, wherein the controller is configured to transmit the electrode slurry lot information allocated to the final supply tank to a manufacturing execution system of a factory.

11. The system of claim 1,
wherein a direct upstream tank introduces the electrode slurry into the final supply tank,
and wherein the controller is configured to record and manage identification information of the direct upstream tank in accordance with the electrode slurry lot information allocated to the final supply tank.

* * * * *